United States Patent [19]

Wampfler et al.

[11] Patent Number: 4,690,954
[45] Date of Patent: Sep. 1, 1987

[54] HALOGENATED PHOSPHORATE ETHERS WITH FLAME-RETARDANT POLYURETHANES

[75] Inventors: David J. Wampfler; Donna J. Fielding, both of Midland; Chester E. Pawloski, Bay City, all of Mich.

[73] Assignee: The Dow Chemical Company, Midland, Mich.

[21] Appl. No.: 856,524

[22] Filed: Apr. 28, 1986

[51] Int. Cl.$^4$ ............................................. C08G 18/14
[52] U.S. Cl. ................................ 521/107; 252/182; 521/108; 524/130; 524/131; 524/132; 524/133; 524/135; 524/136; 524/139; 524/140; 524/141; 524/142; 524/144
[58] Field of Search ................ 521/107, 108; 524/130, 524/131, 132, 133, 135, 136, 139, 140, 141, 142, 144; 252/182

[56] References Cited

U.S. PATENT DOCUMENTS

| | | | |
|---|---|---|---|
| Re. 124,514 | 6/1958 | Hoppe et al. | 260/2.5 |
| 1,922,459 | 1/1933 | Schmidt et al. | 260/106 |
| 1,936,985 | 3/1933 | Lommel et al. | 260/98 |
| 2,846,408 | 6/1958 | Brochhagen et al. | 260/2.5 |
| 2,871,219 | 7/1959 | Baggett et al. | 260/45.95 |
| 2,891,073 | 9/1959 | Smith | 260/340.2 |
| 3,058,921 | 10/1962 | Pannell | 260/2 |
| 3,093,599 | 11/1953 | Mueller-Tamm et al. | 260/2.5 |
| 3,132,169 | 1/1964 | Birum et al. | 260/461 |
| 3,215,652 | 8/1974 | Kaplan et al. | 260/2.5 |
| 3,324,205 | 6/1967 | Carpenter et al. | 260/963 |
| 3,732,342 | 4/1973 | Gibbons et al. | 260/950 |
| 3,755,212 | 5/1973 | Dunlap et al. | 260/2.5 BD |
| 3,784,500 | 5/1974 | Gibbons | 260/30.4 R |
| 3,821,130 | 6/1974 | Barron et al. | 260/2.5 BD |
| 3,849,146 | 7/1974 | Walters et al. | 96/107 |
| 3,955,028 | 8/1976 | Weil | 260/2.5 |
| 4,035,331 | 7/1977 | Olstowski | 524/712 |
| 4,067,931 | 1/1978 | Batorewicz | 524/712 |
| 4,083,825 | 4/1978 | Albright et al. | 260/45.7 P |
| 4,101,470 | 8/1978 | McEntire | 521/118 |
| 4,172,863 | 10/1979 | Waldmann | 521/118 |
| 4,235,975 | 12/1980 | Preston et al. | 521/115 |
| 4,275,171 | 9/1981 | Wegner | 521/115 |
| 4,298,709 | 11/1981 | Ginter et al. | 521/115 |
| 4,433,170 | 2/1984 | Zimmerman et al. | 521/115 |
| 4,450,246 | 5/1984 | Jachimowicz | 521/129 |
| 4,464,488 | 11/1984 | Zimmerman et al. | 521/115 |

OTHER PUBLICATIONS

U.S. patent application Ser. No. 778,100, filed Jun. 1985, Kruper.
U.S. patent application Ser. No. 843,452, filed Apr. 1986, Pawloski.
U.S. patent application Ser. No. 856,523, Apr. 1986, Pawloski.
Chem. Abs., 91:124836a, Hamamura et al. (1979).
Chem. Abs., 83:163630h, Maki (1975).
Chem. Abs., 78:110564e, Tamazaki et al.
The Flexible Polyurethane Foam Handbook, The Dow Chemical Company, U.S.A., Urethanes Department (1984).
Kohler et al., J. Amer. Chem. Soc., 49, 3181–88 (1927).
ASTM E-84.
ANSI/ASTM D-2863-77.
German DIN-4102-B2.
*Calif. Tech. Bull. 117*, State of California Dept. of Consumer Affairs Bureau of Home Furnishings, N. Highlands, CA (Jan. 1980).
*Chemical Week*, 137(18), 17 (Oct. 30, 1985).
Rose; Honkomp & Hach, "A New High Efficiency Flame-Retardant for Flexible Polyurethane Foam" (Oct. 23–25, 1985).
Great Lakes Chemical Corp., Product Information on Fire Master ®836 TM (Oct. 18, 1985).

*Primary Examiner*—Maurice J. Welsh
*Attorney, Agent, or Firm*—Christopher John Rudy

[57] ABSTRACT

A method for improving a production characteristic of flame-retardant polyurethanes. The characteristic may be selected from the group consisting of
(1) processability;
(2) scorch;
(3) odor; and
(4) flame-retardant efficiency.

The method comprises incorporation into a polyurethane an amount effective to reduce combustibility of a haloether phosphorate flame-retardant under conditions sufficient to improve said characteristic. Also, the flame-retardant polyurethane composition such as prepared by said method. Preferably, the polyurethane is a foam, especially a flexible foam and most especially flexible slabstock foam.

17 Claims, No Drawings

HALOGENATED PHOSPHORATE ETHERS WITH FLAME-RETARDANT POLYURETHANES

FIELD

This invention concerns phosphorus-containing flame retardants. It also concerns flame-retardant polyurethanes, preferably polyurethane foams, more preferably flexible polyurethane foams, especially slabstock, with the phosphorus-containing flame retardants.

BACKGROUND

Certain uses of phosphorus-containing flame-retardant components, especially phosphorus in conjunction with halogens are known. For example, Lommel et al., U.S. Pat. No. 1,936,985 (1933), disclose the production of certain phosphorus and phosphoric acid esters of oily consistency which may contain a halogen and which are capable of reducing the flammability of organic materials if incorporated therewith. It is taught that their viscosity increases with increasing carbon content.

Gibbons et al., U.S. Pat. No. 3,732,342 (1973) (incorporated herein by reference), disclose certain bromoether phosphorates. These phosphates were disclosed to be useful as fire-retardant plasticizers for polyvinyl chloride and as a fire retardant for latex resin.

Hamamura et al., Chemical Abstracts, 91:124836a (1979); Maki, Chemical Abstracts, 83:163630h (1975); and Tamazaki et al., Chemical Abstracts, 78:110564e (1973) each disclose certain halogenated etherified phosphorates as in fire-retardant polyester or acrylic fabrics or plastic films; as flame-resistant agents; as halogen-containing phosphates, respectively.

Birum et al., U.S. Pat. No. 3,132,169 (1964) (incorporated herein by reference), disclose the preparation of certain phosphate esters which contain both chlorine and bromine. It is disclosed that polyurethanes, for example, insulating foams and resin bases for curable coatings and adhesives, may be made flame-retardant by the addition of the phosphate esters in amounts from 2 percent to 25 percent by weight of the polyurethane. It is also disclosed that simultaneous plasticizing results and the use of the phosphate esters in the polyurethane foams taught therein (i.e., rigid foams) can increase flexibility and in some applications improve the mechanical properties of the foams.

Fesman, U.S. Pat. No. 4,477,600 (1984), discloses certain polyurethanes with certain phosphonate ethers and antioxidants. It is disclosed that the polyurethanes are low scorch.

Wegner, U.S. Pat. No. 4,275,171 (1981), discloses certain production of flexible flame-retardant polyurethane foams. The foams contain certain halogenated phosphonate and phosphate ester plasticizers.

Waldmann, U.S. Pat. No. 4,172,863 (1979), discloses certain halogen-containing organic phosphorus compounds which contain reactive functional groups and certain fire-retardant polymeric compositions containing the compounds. The polymeric compositions include polyurethanes.

Weil, U.S. Pat. No. 3,955,028 (1976), discloses certain 3-bromo-2,2-bis(bromomethyl)propyloxy phosphorus compounds with reactive functional groups. The compounds are disclosed to be useful to flame retard certain polymers. See, e.g., column 7, lines 35–47.

Ginter et al., U.S. Pat. No. 4,298,709 (1981) (incorporated herein by reference), disclose certain polyhydroxyl polyether phosphorates which may contain halogen. It is disclosed that these phosphorates are useful as flame retardants which react with polyfunctional chain-forming compounds, for example, in production of polyurethanes.

Preston et al., U.S. Pat. No. 4,235,975 (1980), disclose that addition of flame retardants to foam formulations introduces its own peculiar scorch problems.

Mueller-Tamm et al., U.S. Pat. No. 3,093,599 (1963), disclose that properties of suitable compounds for the flame-proofing of plastics include odorlessness and low volatility.

Numerous problems continue to beset the commerical polyurethane foamer who desires to produce a highly marketable flame-retardant foam, especially a slabstock flexible foam. Among these can be (1) processability;
(2) scorch;
(3) odor;
(4) flame-retardant efficiency; and
(5) cost.

Processability may be a function of the number of flame-retardant components needed to be introduced and their physical state upon introduction. Simplicity of the flame-retardant component is desirable. A liquid phase flame-retardant component is often preferred. Low viscosity liquids are desirable because of their ease of introduction into the foam formulation and increased uniformity of distribution throughout the foam. A liquid flame-retardant component having a Brookfield viscosity of about 4000 cP (i.e., centipoise) or below is desirable for processing ease, Flame-retardant components with lower viscosities are preferable for flexible polyurethane foam production. Typically, additive-type flame-retardant components offer better processability over reactive types.

Scorch is typically a yellow or brown discoloration of the flame-retardant polyurethane foam, particularly in the center of the foam sample which is commonly called a bun. Scorch may be indicative of degradation of the foam and occurs mainly in higher water formulations. Increased ambient humidity during foaming may play a part in scorching. Scorch is typically much more of a problem in flexible polyurethane foams in comparison to rigid polyurethane foams, which are commonly also known as insulating foams, and is typically much more apparent in foams from large-scale production runs than in foams from small-scale laboratory tests. One of the reasons for this is the increased production scale itself which may result in heat-transfer difficulties from the exothermic foaming reaction as well as the inherent insulating properties of the polyurethane foam. In commercial production, the bun may reach temperatures of about 100° C. to about 180° C. for several minutes to a few hours. For example, bun temperatures of about 140° C. to about 160° C. for about 15 to 30 minutes may be encountered. See, e.g., *The Flexible Polyurethane Foam Handbook*, The Dow Chemical Company, U.S.A., Urethanes Department (1984) (incorporated herein by reference) at pp. 19–20. Well controlled small-scale laboratory tests for scorch can be indicative of those flame-retardant flexible polyurethane foams which may not scorch in production. However, the best indication of a non-scorching foam still remains the large-scale commercial-type production.

Odor is a problem of the flame-retardant foam, especially in the flexible polyurethanes containing certain additive-type flame-retardant components. A musty odor may often be difficult to overcome, especially in certain liquid flame-retardant components which are in more flame-retardant-effective formulations.

Flame-retardant efficiency after production may be of concern, especially in certain commercial flame-retardant flexible polyurethane foams having a volatile additive-type flame-retardant component. Lower molecular weight liquid flame-retardant components, although they may have concurrently good processability, may occasion this problem. Higher molecular weight additive flame-retardant components may be employed to help overcome this, but processability may suffer, and it may then become difficult to efficiently obtain a homogeneous distribution of flame retardant in the foam.

Cost is always of concern to the commercial foamer. The cost may be directly linked to the price of the foam components and to the amount of flame-retardant components which desirably and favorably affect solutions to problems such as the first four enumerated.

What is lacking and what is needed in this area is a phosphorus-containing flame-retardant component which when incorporated into a polyurethane foam, especially in a flexible polyurethane foam, may be used to produce a highly marketable flame-retardant polyurethane foam, especially flexible slabstock foam. It is especially desirable that any such flame-retardant component overcome real-world problems which continue to beset the commercial polyurethane foamer such as processability, scorch, odor, flame-retardant efficiency and cost.

SUMMARY

In one aspect, the invention is a method for improving a production characteristic of flame-retardant polyurethanes comprising incorporation into a polyurethane an amount effective to reduce combustibility thereof, a haloether phosphorate flame-retardant compound under conditions sufficient to improve said characteristic.

Another aspect of the invention is the flame-retardant polyurethane composition produced by said method. Polyurethanes are polymeric resinous materials which find utility in coatings, as foamed materials which are used in structural applications such as in insulating foams in buildings (e.g., rigid foams) and in cushioning foams in upholstering (e.g., flexible foams).

The invention may significantly improve marketability of commercial flame-retardant polyurethanes. It substantially solves one or more of the production characteristics of flame-retardant polyurethanes, especially in foams and most especially in flexible slabstock foams. In commercial production, reductions in such characteristics are not only desirable but may provide a basis for competitive commercial viability.

ILLUSTRATIVE EMBODIMENTS

The haloether phosphorate flame-retardant compound is a phosphorus acid ester compound containing halo- and ether-substituted hydrocarbon moieties. Halogens herein include chloro and bromo.

Connectable means directly or indirectly covalently bonded. Connected means directly covalently bonded. For example, a neocarbyl moiety may be connected to a phosphate moiety at the phosphate ester oxygen; a neocarbyl moiety can also be connectable to a phosphate moiety through an alkoxy moiety which is connected to the phosphate moiety at the phosphate ester oxygen.

The haloether phosphorate flame-retardant compound is preferably a (halo(haloalkoxy)alkyl)bis(haloalkyl)phosphorate or a (($\beta$-neocarbyl)bis(haloalkyl)ether) phosphorate. Preferably, the halo(haloalkoxy)alkyl moiety is of about 10 carbons maximally and contains at least 2 halo moieties, most preferably containing 3 halo moieties. Preferably, the haloalkyl moieties are from about 2 to about 6 carbons, and when in conjunction with the halo(haloalkoxy)alkyl, from 2 to 4 carbons.

The (halo(haloalkoxy)alkyl)bis(haloalkyl)phosphorate flame-retardant compound is preferably a phosphate ester ether of the general formula

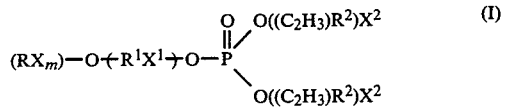

(I)

wherein m is 1 or 2, preferably 2;

R and $R^1$ are separately at each occurrence $C_{3-4}$ alkyl(halo-substituted), each preferably $C_3$-straight-chained-alkyl(halo-substituted);

$R^2$ is separately at each occurrence H, $C_{1-2}$ alkyl or $C_{1-2}$ haloalkyl, preferably H, methyl or halomethyl; and X, $X^1$ and $X^2$ are separately at each occurrence halo, preferably containing bromo.

The haloether phosphorate flame-retardant compound is most preferably the (($\beta$-neocarbyl)bis(haloalkyl)ether)phosphorate. The $\beta$-neocarbyl moiety is a saturated carbon-containing moiety which has a quaternary (i.e., 4°) carbon bonded directly to a carbon which forms a bond connectable to the phosphorus through an oxygen such as in an ether of a phosphate ester ether or in a phosphate ester. The $\beta$-neocarbyl moiety is alkyl or haloalkyl, more preferably haloalkyl. The haloalkyl moiety is a saturated halo-substituted hydrocarbyl moiety without a 4° carbon. The haloalkyl moiety is likewise connectable to the phosphorus.

The (($\beta$-neocarbyl)bis(haloalkylether)phosphorate flame-retardant compound is preferably a phosphate ester ether of the general formula

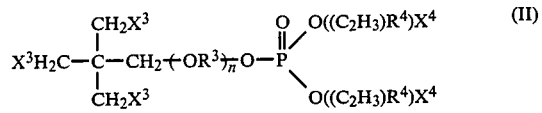

(II)

wherein n is an integer from 0 to 5, preferably 0 or 1;

$R^3$ $C_{2-5}$ alkyl or $C_{3-7}$ haloalkyl;

$R^4$ is separately at each occurrence H, $C_{1-4}$ alkyl, $C_{3-7}$ hydrocarbyloxyalkyl, $C_{1-4}$ haloalkyl or $C_{3-7}$ haloalkoxyalkyl;

$X^3$ is separately at each occurrence H, Cl, Br or $C_{1-5}$ alkyl, preferably H, Cl or Br, most preferably Br; and $X^4$ is separately at each occurrence H, Cl or Br, preferably Cl or Br, and at least one $X^3$ or $X^4$ is Cl or Br, provided that if each $R^4$ is H or $C_{1-4}$ alkyl, n is at least 1, and if n is 0, $R^4$ is $C_{3-7}$ hydrocarbyloxyalkyl or $C_{2-7}$ haloalkoxyalkyl and preferably one $X^4$ is Cl and one $X^4$ is Br.

Preferably, $R^3$ is —$CH_2CH_2$, —$CH(CH_2X^4)CH_2$ or —$(CH_2CH)CH_2OCH_2CHX^4CH_2X^4$. Most preferably $R^3$ is $-CH_2CH_2$, $-CH(CH_3)CH_2$, $-(CH_2CH)CH_2OCH_2CHBrCH_2Br$ or $-CH_2CHClCH_2$.

Preferably, $R^4$ is separately in each occurrence H, $C_{1-4}$ alkyl or $C_{1-4}$ haloalkyl. More preferably, $R^4$ is H or methyl, and most preferably H because this provides a material with low viscosity and good thermal stability.

Preferably, the phosphorate has a low viscosity such as a Brookfield viscosity. The Brookfield viscosity is measured at 25° C. on a Brookfield viscometer with a number 6 spindle rotating at 100 rotations per minute (i.e., rpm) submersed with sample in the center of a sample vessel with a width at least 125 percent of the spindle diameter.

Preferably, the Brookfield viscosity of the flame-retardant compound is 5000 cP or below at 25° C., more preferably 2500 cP or below and most preferably 1500 cP or below. The Brookfield viscosity can be as low as 500 cP or below, for example, even as low as 200 cP or below.

Preferably, the phosphorates have high thermal stability. One preferred method to measure this is by thermogravimetric analysis (i.e., TGA), where the sample tested is continuously monitored for weight loss at its temperature is progressively increased in an oven with a nitrogen atmosphere. The progressive temperature increase is at a rate of 20° C. per minute from an initial temperature of 20° C. with the sample size initially between 0.010 g and 0.020 g. Under these test conditions, thermogravimetric analyses preferably have a 50 percent weight loss of sample (i.e., $TGA_{50}$) at a temperature of about 200° C. or above, more preferably about 250° C. or above and most preferably about 280° C. or above. It is especially preferred that the $TGA_{50}$ is about 300° C. or above.

The thermogravimetric analysis at 10 percent weight loss (i.e., $TGA_{10}$) may be used also. The $TGA_{10}$ is otherwise measured as is the $TGA_{50}$. Preferred $TGA_{10}$ values include values found at about 160° C. or above, more preferably about 200° C. or above and most preferably about 250° C. or above.

Various procedures can be employed to prepare the haloether phosphorates. One preferred procedure involves a cyclic phosphite intermediate. A second involves an ether alcohol with a phosphorus oxyhalide. A third involves an ether oxirane with an oxyphosphorus(V) reactant. A fourth involves halogen substitution with a phosphite intermediate such as disclosed in copending U.S. patent application, filed Mar. 24, 1986 (Attorney Docket No. C-34,970) (incorporated herein by reference).

The first preferred procedure involves a cyclic phosphite intermediate. The cyclic phosphite intermediate can be prepared from a diol and a phosphorus trihalide such as disclosed by the general method of the Birum et al. patent, U.S. Pat. No. 3,132,169 (1969). The following preferred general reaction sequence illustrates this first procedure:

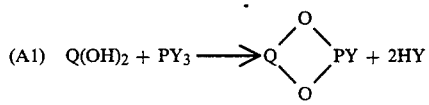

(III)

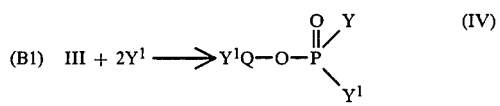

(IV)

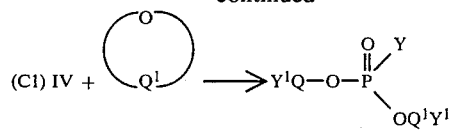

(V)

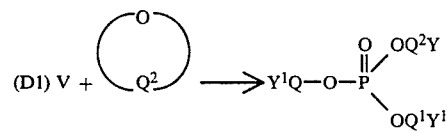

(VI)

wherein $Q(OH)_2$ is the appropriate diol, and Q corresponds to a residue of the diol imparted to the haloetherphosphorate;

$Q^1$ is the appropriate oxirane residue imparted to the haloetherphosphorate, preferably from a $C_{4-8}$ $Q^1$-oxirane which has an ether linkage and is ethylenically (i.e., C=C) unsaturated, and which can be subsequently halogenated to yield a haloalkoxyhaloalkyl moiety;

$Q^2$ is the appropriate oxirane residue imparted to the haloetherphosphorate from a $Q^2$-oxirane, especially as $C_{2-8}$ alkyl or haloalkyl;

Y is separately at each occurrence F, Cl or Br, preferably Cl or Br, most preferably Cl;

$Y^1$ is halogen (F, Cl, Br or I), preferably different from Y, more preferably Cl or Br, most preferably Br; thus, III is the cyclic phosphite intermediate, and VI is the haloetherphosphorate.

Diols which are most preferably employed to prepare the haloetherphosphorates are employed to prepare the (β-neocarbyl)-containing phosphorate ether flame-retardant component of the invention. Such diols can include, for example, 2,2-bis(bromomethyl)-1,3-propanediol; 2,2-dimethyl-1,3-propanediol; 2-bromomethyl-2-methyl-1,3-propanediol; and 2,2-bis(chloromethyl)-1,3-propanediol. Especially preferred as 2,2-bis(bromomethyl)-1,3-propanediol and 2,2-dimethyl-1,3-propanediol.

Other diols can be employed to prepare the (halo(haloalkoxy)alkyl)bis(haloalkyl)phosphorate is by the general method of the Birum et al. patent. Such diols can include, for example, ethylene glycol and propylene glycol.

Preferred phosphorus reactants for this purpose include phosphorus trihalides, for example, phosphorus trifluoride, phosphorus trichloride, phosphorus tribromide and phosphorus dichloride bromide. The phosphorus reactant phosphorus trichloride is most preferred.

The $Q^2$-oxiranes can include ethylenically unsaturated oxy oxiranes such as allyl glycidyl ether and methallyl glycidyl ether. Most preferably employed of the $Q^2$-oxiranes is allyl glycidyl ether. The use of an oxirane such as this is preferably followed by halogenation of the carbon to carbon double bond, for example, with elemental bromine.

The $Q^2$-oxirane is preferably an alkylene oxide or a halogenated oxirane. Alkylene oxides (alkyl oxiranes) such as ethylene oxide, propylene oxide and butylene oxide are preferably employed to prepare the haloetherphosphorate flame-retardant component of the invention. Ethylene oxide and propylene oxide are especially preferred alkylene oxides.

Halogenated oxiranes such as trihaloethenyl oxiranes (e.g., 1-(1,2,2-trichloroethenyl)-1,2-ethylene oxide) such as disclosed in copending U.S. patent application Ser. No. 778,100, filed Sept. 20, 1985 (Attorney Docket No. C-34,337) (incorporated herein by reference), epichlorohydrin and epibromohydrin can also be employed. Haloalkyl oxiranes such as epibromohydrin and epichlorohydrin are preferred.

A Lewis acid catalyst is preferably employed in the steps C1 and D1. Preferred catalysts include, for example, $AlBr_3$, $AlCl_3$ and $TiCl_4$, with $AlCl_3$ and $TiCl_4$ being most preferred. The Lewis acid catalyst is preferably present during these steps. The amount of the catalyst can vary depending on the specific catalyst employed. For the most part, amounts of the catalyst preferably correspond to a molar ratio of the catalyst to the initial phosphorus trihalide from about 1:1000 to about 1:5, most preferably from about 1:200 to about 1:10.

Reaction conditions are those sufficient to prepare the haloetherphosphorates. In general, the temperature is typically from about room temperature (20° C.) to about 100° C., preferably up to the general vicinity (e.g., ± about 10° C.) of 80° C.; the pressure is preferably about 1 atm. The time required typically varies with the type and amount of reactants employed, especially in a sequence such as a batch process.

A liquid diluent such as a halogenated alkane is preferably employed. Preferred halogenated alkanes include, for example, carbon tetrachloride, chloroform and methylene chloride. It is preferred that the liquid diluent is employed at the outset of the sequence and throughout the course of the sequence until its removal, for example, during purification of the product such as by evaporation of the liquid diluent and product distillation. The liquid diluent preferably has a normal boiling point at or below the temperature range employed during the course of the sequence. The liquid diluent can be employed at reflux.

Preferred temperatures during this first step are from about 20° C. to about 80° C., most preferably from about 25° C. to about 50° C. The pressure is preferably ambient pressure. This first step typically continues until reaction is complete. The Lewis acid catalyst may be present for this step, but preferably such a catalyst is absent here.

The second step (B1) in this sequence involves contact with the halogenating agent. Preferred halogenating agents for step B1 are the elemental and diatomic halogens such as, for example, $F_2$, $Cl_2$, $Br_2$, $BrCl$ and $I_2$. More preferred halogenating agents are, for example, the elemental halogens chlorine and bromine. Elemental bromine is the most preferred. Temperatures during this halogenating contact are typically lower than in the first step, preferably from about minus (i.e., $-10°$ C.) 10° C. to about 25° C., most preferably from about $-5°$ C. to about 5° C. The pressure is preferably ambient. This second step continues until the desired level of halogenation is complete. For example, this step may be carried out until halogen decolorization, especially in the case of a halogenating agent such as elemental bromine.

The third step (C1) and fourth step (D1) in this sequence involve contact of the reaction product of the preceding step with an oxirane (or mixture of oxiranes). Preferably, the oxirane of each of these steps is employed in amounts corresponding to a molar ratio of the molar amount of the oxirane to the initial molar amounts of the phosphorus trihalide from about 3:4 to about 4:3, most preferably about 1:1. Preferred temperatures during this third step are from about 20° C. to about 80° C., most preferably from about 20° C. to about 50° C. The pressure is preferably ambient pressure. These steps typically continue until completion.

An additional step in this sequence can be an additional halogenation which is carried out for the most part to add halo moieties to any ethylenically unsaturated bonds such as may be necessary when employing the ethylenically unsaturated oxy oxiranes such as allyl glycidyl ether and methallyl glycidyl ether. The halogenating agent may be a halogenating agent such as a hydrohalide (e.g., HCl or HBr), although the element halogens chlorine and bromine, and especially bromine, are preferred. Preferably, conditions are typically such as involved in the second step of this sequence.

The reaction product may then be worked up to obtain the purified phosphorate. A preferred work up involves serially washing with dilute acid; washing with dilute base; drying over a drying agent such as sodium sulfate; filtering, and removing low boilers by distillation under reduced pressure at a temperature of about 80° C. or lower.

The second procedure involves an ether alcohol with a phosphorus oxyhalide. The following preferred general reaction sequence illustrates this second procedure:

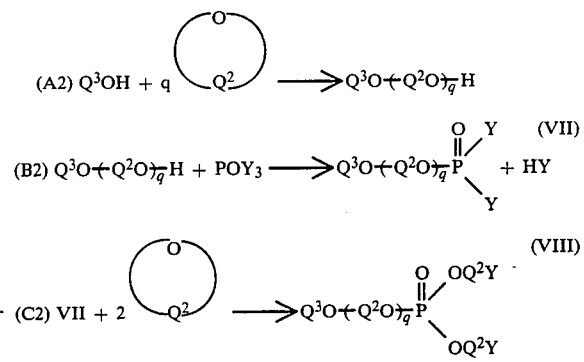

wherein
q is an integer from 1 to about 5;
$Q^2$ is separately in each occurrence the appropriate residue such as an oxirane residue imparted to the haloetherphosphorate from the $Q^2$-oxirane, especially as $C_{2-8}$ alkyl or haloalkyl;
$Q^3OH$ is the appropriate alcohol (preferably with one active hydrogen moiety as determined by the Zerewitnoff test), and $Q^3$ corresponds to a residue of the alcohol imparted to the haloetherphosphorate;
$Q^3O(Q^2O)_qH$ is the ether alcohol;
Y is separately at each occurrence F, Cl or Br, preferably Cl or Br; thus,
$POY_3$ is the phosphorus oxyhalide, and VIII is the haloetherphosphorate.

The first step (A2) is employed to prepare the ether alcohol. Preferably, conditions are generally such as of the first step of the procedure disclosed by Gibbons, U.S. Pat. No. 3,784,500 (1974) (incorporated herein by reference). Preferred alcohols include alcohols such as disclosed in the copending U.S. patent application, filed Mar. 24, 1986 (Attorney Docket No. C-34,970), for example, 3-chloro-2,2-bis(chloromethyl)propanol, 3-bromo-2,2-bis(bromomethyl)propanol and 3-bromo-2,2-dimethylpropanol. Preferred oxiranes are the $Q^2$-oxiranes, for example, ethylene oxide. A preferred catalyst for this step is boron trifluoride etherate. Preferably, the alcohol and oxirane are contacted in a 1:1 mole ratio.

The second step (B2) involves contact of the ether alcohol with the phosphorus oxyhalide. Examples of the phosphorus oxyhalides include phosphorus oxyfluoride, phosphorus oxychloride, phosphorus oxybromide, phosphorus oxydibromide chloride and phosphorus oxybromide dichloride. Conditions are generally similar to those employed in the analogous steps which involve the phosphorus trihalides (e.g., A1). In general, the intermediate VII need not be isolated or purified.

The third step (C2) involves the appropriate oxiane (e.g., $Q^2$-oxirane). Most preferred oxiranes for this step include ethylene oxide, propylene oxide and epichlorohydrin. In addition, oxiranes such as allyl glycidyl ether can be employed at this step, and this is preferably followed by halogen addition. Conditions are typically such as those employed with the oxirane additions such as in steps C1 and D1 herein, Preferably, two moles of the oxirane (i.e., e.g., $Q^2$-oxirane) are employed per mole of intermediate, produced from the B2 step. A preferred catalyst is aluminum trichloride.

Purification of the haloetherphosphorate is typically similar to the purification of the first procedure. For example, distillation is preferred.

The third procedure involves an ether oxirane with an oxyphosphorus(V) reactant. The following preferred general reaction sequence illustrates this third procedure:

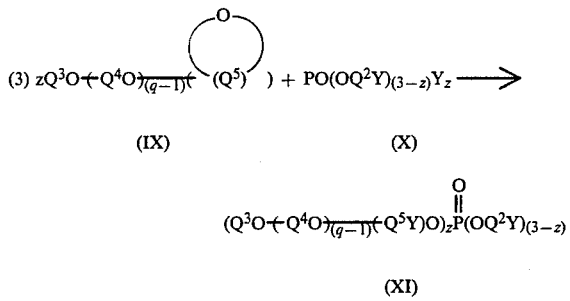

wherein
q is the integer from 1 to about 5;
z is one or two, preferably one;
$Q^2$ is separately at each occurrence the appropriate residue such as an oxirane residue imparted to the haloetherphosphorate from the $Q^2$-oxirane, especially as $C_{2-8}$ alkyl or haloalkyl;
$Q^3$ is the appropriate residue such as the $Q^3$-alcohol residue;
$Q^4$ is separately at each occurrence the appropriate residue such as an oxirane residue imparted to the haloetherphosphorate, especially as $C_{2-8}$ alkyl or haloalkyl, preferably such as from epichlorohydrin;
$Q^5$ is the appropriate residue of the oxirane, preferably such as $C_{3-8}$ alkyl;
Y is separately at each occurrence F, Cl or Br, preferably Cl or Br; thus
IX is the ether oxirane;
X is the oxyphosphorus(V) reactant; and thus,
XI is the haloetherphosphorate.

Conditions are those sufficient to prepare the haloetherphosphorate (XI). In general, conditions are similar to the foregoing oxirane addition steps in the first two procedures. Preferably, a catalyst such as titanium tetrachloride is employed. Purification is appropriately generally similar.

The ether oxirane can be obtained or be prepared by known methods. For example, reaction of the appropriate alcohol, 1 mole of 3-bromo-2,2-bis(bromomethyl)-propanol, with 1 mole of epichlorohydrin, then 1 mole butadiene monoxide, followed by addition of hypochlorous acid and subsequent treatment with solid sodium hydroxide can prepare an ether oxirane such as of the following general formula:

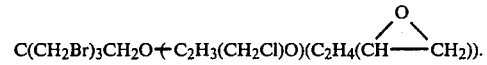

Examples of ether oxiranes also include 4-tert-butylphenyl-2,3-epoxypropylether and 1,2-epoxy-3-phenoxypropane. Preferred ether oxiranes also included 3-bromo-2,2-bis(bromomethyl)propy glycidyl ether and 1-chloro-3-(3-bromo-2,2-bis(bromomethyl)propoxy)propyl glydicyl ether.

The oxyphosphorus(V) reactant can be obtained or be prepared by known methods. For example, reaction of phosphorus oxychloride with 2 moles of ethylene oxide can prepare bis(2-chloroethyl)phosphorochloridate.

The polyurethanes of this invention comprise organic polyisocyanates, polyahls and flame-retardant amounts of the phosphorus compounds of this invention. Preferably, flame-retardant amounts of phosphorus compounds are between about 2 and 20 parts by weight of the polyahl, most preferably between about 8 and 12 parts by weight of the polyahl.

The term polyahl includes any organic compound having at least two active hydrogen moieties and an average molecular weight of at least about 60. For the purpose of this invention, an active hydrogen moiety refers to a moiety containing a hydrogen atom which, because of its position in the molecule, displays significant activity according to the Zerewitnoff test such as described by Kohler et al., *J. Amer. Chem. Soc.*, 49, 3181–88 (1927). Examples of such active hydrogen moieties include —COOH, —OH, NH$_2$, =NH, CONH$_2$, SH and —CONH—. Typical polyahls include polyols, polyamines, polyamides, polymercaptans, polyacids and the like, as exemplified by Rosenkranz et al. in U.S. Pat. No. 3,928,299 (1975) (incorporated herein by reference).

Of the polyahls, the polyols are preferred. Examples of such polyols useful in this invention are the polyol polyethers, the polyol polyesters, hydroxy functional acrylic polymers, hydroxyl-containing epoxy resins, polyhydroxy-terminated polyurethane polymers, polyhydroxy-containing phosphorus compounds and alkylene oxide adducts of compounds such as polyhydric thioethers including polythioethers, acetals including polyacetals, aliphatic and aromatic polyols and thiols including polythiols, ammonia and amines including aromatic, aliphatic and heterocyclic amines including polyamines as well as mixtures thereof. Alkylene oxide adducts of compounds which contain two or more different groups within the above-defined classes may also be used such as amino alcohols which contain an amino group and hydroxyl group. Also alkylene adducts of compounds which contain one —SH group and one —OH group as well as those which contain an amino group and a —SH group may be used. Preferred polyols are polyol polyethers.

Polyether polyols which can be advantageously employed in the practice of this invention are the polyalkylene polyether polyols including the polymerization products of alkylene oxides and other oxiranes with water or polyhydric alcohols having from 2 to 8 hydroxyl groups. Exemplary alcohols that are advantageously employed in making the polyether polyol include ethylene glycol, 1,3-propylene glycol, 1,2-propylene glycol, 1,4-butylene glycol, 1,3-butylene glycol, 1,2-butylene glycol, 1,5-pentanediol 1,7-heptanediol, glycerol, 1,1,1-trimethylolpropane, 1,1,1-trimethylolethane, hexane-1,2,6-triol, α-methyl glucoside, pentaerythritol, erythritol, pentatols and hexatols. Also include within the term "polyhydric alcohol" are sugars such as glucose, sucrose, fructose and maltose as well as compounds derived from phenols such as 2,2-(4,4'-hydroxyphenyl)propane, commonly known as bisphenol A. Illustrative oxiranes that are advantgeously employed in the preparation of the polyether polyol include simple alkylene oxides such as ethylene oxide, propylene oxide, butylene oxide, and amylene oxide; glycidyl ethers such as t-butyl glycidyl ether and phenyl glycidyl ether; and random or block copolymers of two or more of these oxiranes. The polyalkylene polyether polyols may be prepared from other starting materials such as tetrahydrofuran and alkylene oxide tetrahydrofuran copolymers; epihalohydrins such as epichlorohydrin; as well as aralkylene oxides such as styrene oxide. The polyalkylene polyether polyols may have primary, secondary or tertiary hydroxyl groups and, preferably, are polyethers prepared from alkylene oxides having from 2 to 6 carbon atoms such as ethylene oxide, propylene oxide and butylene oxide. The polyalkylene polyether polyols may be prepared by any known process such as, for example, the process disclosed by Schmidt et al., U.S. Pat. No. 1,922,459 (1933); Baggett et al., U.S. Pat. No. 2,871,219 (1959); Smith, U.S. Pat. No. 2,891,073 (1959) and Pannell, U.S. Pat. No. 3,058,921 (1962) (each incorporated herein by reference). Polyether polyols which are most preferred include those such as alkylene oxide addition products of water, trimethylolpropane, glycerine, pentaerythritol, sucrose, sorbitol propylene glycol and blends thereof having hydroxyl equivalent weights of from about 250 to about 5000.

Especially preferred polyether polyols include the polyether triols with equivalent weight from about 500 to about 2500 and a polyether triol/diol blend with overall functionality from about 2.5 to 3. The polyether polyols can be poly(oxypropyl)triols with (oxyethyl) blocks which may be from about 5 percent by weight to about 20 percent by weight. These are typically used in flexible polyurethane foams.

Organic polyisocyanates which can be employed include aromatic, aliphatic and cycloaliphatic polyisocyanates and combinations thereof. Representative of these types are the diisocyanates such as m-phenylene diisocyanate, tolylene-2,4-diisocyanate, tolylene-2,6-diisocyanate, hexamethylene-1,6-diisocyanate, tetramethylene-1,4-diisocyanate, cyclohexane-1,4-diisocyanate, hexahydrotolylene diisocyanate (and isomers), naphthylene-1,5-diisocyanate, 1-methoxyphenyl-2,4-diisocyanate, diphenylmethane-4,4-diisocyanate, 4,4'-biphenylene diisocyanate, 3,3'-dimethoxy-4,4'-diphenyl diisocyanate, 3,3'-dimethyl-4,4'-biphenyl diisocyanate, and 3,3'-dimethyldiphenylmethane-4,4'-diisocyanate; the triisocyanates such as 4,4',4'-triphenylmethane triisocyanate, polymethylene polyphenylisocyanate and tolylene-2,4,6-triisocyanate; and the tetraisocyanates such as 4,4'-dimethyldiphenylmethane-2,2',5,5'-tetraisocyanate. Especially useful due to their availability and properties are tolylene diisocyanate, diphenylmethane-4,4'-diisocyanate and polymethylene polyphenylisocyanate.

Any polyahl, including any phosphorus compound containing hydroxyl or hydroxyalkyl groups, can be readily reacted in the presence of an organic polyisocyanate to form desired polyurethane products using conventional polyurethane reaction conditions and procedures. Such reaction and procedures are optionally carried out in the presence of chain-extending agents, catalysts, surface active agents, stabilizers, blowing agents, fillers and/or pigments. In the preparation of foamed polyurethane, suitable procedures for the preparation of same are disclosed by Hoppe et al., U.S. Pat. No. Re. 24,514 (reissued 1958) (incorporated herein by reference). When water is added as the blowing agent, corresponding quantities of excess isocyanate to react with the water and produce carbon dioxide may be used. It is also possible to proceed with the preparation of the polyurethane plastics by a prepolymer technique wherein an excess of organic polyisocyanate is reacted in a first step with the phosphorus compounds containing α-halo hydroxyalkyl groups and optionally a polyol of the present invention to prepare a prepolymer having free isocyanate groups which is then reacted in a second step with water to prepare a foam. Alternatively, the components may be reacted in a single working step commonly known as the "one-shot" technique of preparing polyurethanes. Furthermore, instead of or in addition to water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride and methylene chloride may be used as blowing agents.

The foams may also be prepared by the froth technique as described by Dunlap et al. in U.S. Pat. No. 3,755,212 (1973); by Barron et al. in U.S. Pat. No. 3,821,130 (1974); and by Walters et al. in U.S. Pat. No. 3,849,146 (1974) which are also incorporated herein by reference. The most preferred technique is the "one-shot" technique, where all the reactants are added simultaneously at the time of foaming. This technique is generally used to prepare flexible polyurethane foams. Most, if not all, modern flexible slabstock (continuous) polyurethane foam machines are designed on the basis of this approach.

Crude polyisocyanate may also be used in the practice of the present invention, such as crude toluene diisocyanate obtained by the phosgenation of a mixture of toluene diamines or crude diphenylmethylene diisocyanate obtained by the phosgenation of crude diphenylmethylenediamine. The preferred undistilled or crude isocyanates are disclosed by Kaplan in U.S. Pat. No. 3,215,652 (1965) (incorporated herein by reference).

Especially preferred polyisocyanates include a mixture of 80 percent by weight 2,4-toluene diisocyanate with 20 percent by weight 2,6-toluene diisocyanate (commonly known as TDI 80/20 or T-80) and a mixture of 65 percent by weight 2,4-toluene diisocyanate with 35 percent 2,6-toluene diisocyanate (i.e., TDI 65/35 or T-65). These are typically used in flexible polyurethane foams. The TDI 80/20 is more preferred.

Chain-extending agents which may be employed in the preparation of the polyurethane compositions of the present invention include those compounds having at least two functional groups bearing active hydrogen atoms such as water, hydrazine, primary and secondary diamines, amino alcohols, amino acids, hydroxy acids, glycols or mixtures thereof. A preferred group of chain-extending agents includes water and primary and secondary aromatic diamines which react more readily with the isocyanate than does water such as phenylenediamine, bis(3-chloro-4-aminophenyl)methane, 2,4-diamino-3,5-diethyl toluene, trisecondary butanolamine, isopropanolamine, diisopropanolamine, N-(2-hydroxypropyl)ethylenediamine, and N,N'-di(2-hydroxypropyl)ethylenediamine.

The most especially preferred chain-extending agent is water. This is typically used in flexible polyurethane foams.

The urethane reaction of polyisocyanate with polyahls is advantageously carried out in the presence of an amount of a urethane-type catalyst which is effective to catalyze the reaction of the hydroxy group on the α-hydroxyalkyl group with the polyisocyanate. Preferably, the amount of urethane catalyst is an amount comparable to that used in conventional urethane-type reactions.

Any suitable urethane catalyst may be used including tertiary amines, such as, for example, triethylenediamine, N-methyl morpholine, N-ethyl morpholine, diethyl ethanolamine, N-coco morpholine, 1-methyl-4-dimethylaminoethyl piperazine, 3-methoxy-N-dimethylpropylamine, N,N-dimethyl-N',N'-methyl isopropyl propylenediamine, N,N-diethyl-3-diethylaminopropylamine, dimethyl benzylamine and the like. Nitrogen-containing catalysts such as disclosed by McEntire in U.S. Pat. No. 4,101,470 (1978); by Zimmerman et al. in U.S. Pat. No. 4,433,170 (1984); by Jachimowicz in U.S. Pat. No. 4,450,246 (1984); and by Zimmerman et al. in U.S. Pat. No. 4,464,488 (1984) (each of which is incorporated herein by reference) may be employed. Other suitable catalysts include, for example, tin compounds such as stannous chloride, tin salts of carboxylic acids such as stannus octoate, dibutyltin di-2-ethyl hexanoate, as well as other organometallic compounds such as are disclosed by Brochhagen et al., U.S. Pat. No. 2,846,408 (1958) (incorporated herein by reference).

A wetting agent(s) or surface-active agent(s) is generally necessary for production of high grade polyurethane foam according to the present invention, since in the absence of same, the foams collapse or contain very large uneven cells. Numerous wetting agents have been found satifactory. Nonionic surfactants and wetting agents are preferred. Of these, the nonionic surface-active agents prepared by the sequential addition of propylene oxide and then ethylene oxide to propylene glycol and the solid or liquid organosilicones have been found particularly desirable. Other surface-active agents which are operative, although not preferred, include polyethylene glycol ethers of long chain alcohols, tertiary amine or alkylolamine salts of long chain alkyl acid sulfate esters, alkyl sulfonic esters and alkyl arylsulfonic acids.

Especially preferred wetting or surface-active agents include non-hydrolyzable silicone surfactants. These are typically used in flexible polyurethane foams.

The haloether phosphorate flame-retardant compound is employed in an amount effective to produce said characteristics which are also flame-retardant in the polyurethane. This flame-retardant is preferably employed in amounts of from about 5 pph to about 20 pph of the polyahl. By pph is meant parts by weight per hundred parts by weight of the polyahl (e.g., the polyol).

Preferred flexible polyurethane foam formulations with which the phosphorus compounds of the invention are incorporated include compositions such as follows:

| Reactant | Concentration (pph) |
| --- | --- |
| polyol | 100 |
| TDI index | 80–120 |
| flame retardant | 6–18 |
| water | 1.0–5.5 |
| silicone surfactant | 0.2–3 |
| tertiary amine catalyst | 0.02–2 |
| auxiliary blowing agent | 0.5–40 |
| tin catalyst | 0.05–0.5 |

Also, foams with densities from about 1.0 pound per cubic foot (i.e., about 16 kg per m$^3$) to about 4.0 pounds per cubic foot (i.e., about 64 kg per m$^3$) are preferred.

The polyurethane production characteristic is preferably selected from the group consisting of
(1) processability;
(2) scorch;
(3) odor; and
(4) flame-retardant efficiency.

Processability is a production characteristic which can be improved. A preferred measure of processability are the lower values of the Brookfield viscosity.

Processability difficulties for higher viscosity flame-retardant compounds may be reduced by the use of diluents such as nonhalogenated phosphate ester compounds. Preferably, such diluents are not used in processing.

Scorch is a production characteristic which can be improved by being reduced, preferably to minimal levels or even eliminated. A preferred measure of scorch, especially in commercial practice, is a ΔE in National Bureau of Standards (i.e., NBS) units by the Hunter Colorimeter test of about 20 or below, more preferably about 6 or below and most preferably about 4 or below.

The Hunter test differs from the Gardner Colorimeter test in that in the Hunter test the color of both the sample set and control set are compared to the color of a standard pure white tile. The standard white tile may contain pure white MgO. The sample versus control difference is determined by subtraction (i.e., sample-control) after this comparison to the tile, and thus, the values of the Hunter test are typically substantially equivalent to values determined by the Gardner test. Determination of the ΔE value in NBS units by the Gardner Colorimeter test is more completely described in Albright et al., U.S. Pat. No. 4,083,825 (1978) from column 8, line 58 to column 11, line 23 (which material is incorporated herein by reference).

The most preferred polyurethane foam sample for the Hunter Colorimeter test, especially with flexible foams, is a representative sample taken from a large-scale commercial production bun. The bun is cross-sectioned and the whole large-scale cross-section of bun is tested for scorch in the minimum number of required 4.0 square-inch (26 cm$^2$) cross-sections (2.0 inches×2.0 inches, i.e., 5.1 cm×5.1 cm), and each smaller-scale ΔE value is summed, and the summation is divided by the required number of 4.0 square-inch cross-sections. This is the average ΔE value of the large-scale sample. The sample is 2.0 inches (2.5 cm) in height. Thus, the sample is a cube of 2.0 inches per side.

As an indicia of potential scorch resistance when incorporated into a polyurethane, especially in a flexible foam, the thermal stability properties of the phosphorate flame-retardant compounds can be used. In general, higher thermal stability compounds are preferably employed.

Odor is a production characteristic which can be improved by being reduced or even eliminated. Odor is especially reduced because halogenated neopentanes are typically not produced at a level sufficient to cause an odoriferous product. Use of a diol such as 2,2-bis(-bromomethyl)-1,3-propanediol typically results in the production of some halogenated neopentane which can cause the odor.

Flame-retardant efficiency is a production characteristic which can be improved. By flame-retardant it is meant that the phosphorate, when incorporated into the polyurethane, reduces the propensity of the polyurethane to propagate combustion after the removal of a small-scale ignition source such as a lit Bunsen burner. The flame-retardant efficiency in additive-type flame-retardant phosphorus compounds incorporated with polyurethanes is typically a function of phosphorus-halogen content. Thus, brominated phosphorus ester compounds are preferred. A higher bromine content increases the flame-retardant efficiency by its mere presence within the composition.

One preferred method to measure this flame-retardant efficiency is an oxygen index (i.e., limiting oxygen index) measured by the oxygen demand test of ANSI/ASTM D-2863-77 (ASTM American National Standard) wherein the minimum concentration of oxygen in a mixture of dry $O_2$ and dry $N_2$ flowing upward, needed to cause combustion in a standard test column that will just support combustion under equilibrium conditions of candle-like burning is measured. Other conditions of the ANSI/ASTM D-2863-77 oxygen demand test include those set out in the ASTM American National Standard test (incorporated herein by reference).

Preferably, for ten appropriate A through D type (as in the D-2863-77 standard) specimens with the flame-retardant composition, the average limiting oxygen index (i.e., average LOI) is raised 10 percent or more, more preferably 20 percent or more and most preferably 30 percent or more, when measured either by time until extinguishing of the flame or distance of the burned specimen according to ASTM D-2863-77, when compared to 10 otherwise comparable specimens without the flame-retardant composition. It is also preferred that the average LOI of 10 appropriate A through D type specimens is raised to above 21, more preferably to about 25 or above and most preferably, to about 30 or above.

When incorporated into a rigid polyurethane foam, such as an insulating foam, preferred measures include the Steiner tunnel test of ASTM E-84 or the equivalent such as Underwriter's Laboratories 723. It is preferred that the rigid foam pass the E-84 test or equivalent with a Class II rating or better. It may be desired to incorporate into the flame-retardant composition an amount effective of the haloetherphosphorate flame-retardant compound to secure a Class I rating. Other tests such as the German DIN-4102-B2 test or its Swiss counterpart may be used.

When incorporated into a flexible polyurethane foam as a flame-retardant, a preferred measure of the flame-retardant efficiency of the flame-retardant foam composition is the Vertical Burn portion of the California 117 test as in California Technical Bulletin 117, State of California Department of Consumer Affairs Bureau of Home Furnishings, North Highlands, Calif. (January, 1980) (incorporated herein by reference). It is preferred that both portions of the Vertical Burn test of the California 117 test are passed by the flame-retardant flexible foam composition, most preferably, the entire California 117 battery of tests.

Reduction of scorch and odor are each, and especially in combination, of high priority. Reduction of problems due to odor and processability or scorch and processability are also desirable. Reduction of each of the problems due to processability, scorch, odor and loss of flame-retardant efficiency is most desired.

SPECIFIC EMBODIMENTS

The following examples further illustrate the invention. Examples 1-12 further illustrate the preparation of the haloalkyl phosphorate ethers. Examples 7 and 8 further illustrate the improving of production characteristics of flame-retardant polyurethanes with the haloalkyl phosphorate ethers.

EXAMPLE 1

Preparation of phosphoric acid: bis(2-chloroethyl)(2-bromo-3-(2,3-dibromopropoxy)-propyl)ester Into a flask was placed 138 g of $PCl_3$ and 500 ml of methylene chloride. This mixture is stirred while 150 g of ethylene oxide is added dropwise in 200 ml of methylene chloride. Upon completion of this addition, the mixture is refluxed for 2 hours, and a portion of the low boilers is distilled off. The mixture is cooled in an ice bath, and 160 g of bromine is added dropwise. Upon warming to room temperature, 1 ml of $TiCl_4$ is added, and 114 g of allyl glycidyl ether is added dropwise. Upon completion of the reaction, the mixture is cooled in an ice water bath, and 160 g of bromine is added dropwise. The product is worked up in the usual manner; to wit: the mixture is next stirred for 1 hour while warming to room temperature. Next, 200 ml of dilute base and ice water solution is added and is stirred for 10 minutes. The product layer is separated, is dried over sodium sulfate, is filtered and low boilers are removed by distillation at 80° C. under reduced pressure. The final product thus obtained to give 509 g of oil at 91 percent yield with Brookfield viscosity (no. 6 spindle; 100 rpm; 25° C.) of 4500 cP. $TGA_{10}$: 236° C.; $TGA_{50}$: 303° C. Molecular weight (i.e., MW, in grams per mole) 560 with 42.8 percent Br; 12.7 percent Cl; 5.5 percent P.

EXAMPLE 2

Preparation of phosphoric acid: bis(2-chloroethyl)(2-bromo-3-(2,3-dibromopropoxy)-propyl)ester Into a flask are placed 46 g of $PCl_3$ (0.33 mole) and 200 ml of carbon tetrachloride. This mixture is stirred while 50 g of ethylene oxide (1.0+ moles) in 100 ml of carbon tetrachloride is added dropwise. Upon completion of the addition, the mixture is refluxed for 2 hours. Some of the low boilers are distilled off. Next, the mixture is cooled to ice water bath temperatures. Next, 53 g of bromine (0.33 mole) is added dropwise. Upon completion of this addition, the mixture is stirred 1 hour while warming to room temperature. One ml of TiCl$_4$ is added, and 38 g of allyl glycidyl ether (0.33 mole) is next added dropwise. The mixture is refluxed for 2 hours and following this is cooled to ice water bath temperatures. Upon cooling, 53 g of bromine (0.33 mole) is added dropwise. The mixture is stirred up in the usual manner to give 111 g of an oil (80 percent yield) with Brookfield viscosity (no. 6 spindle; 100 rpm; 25° C.) of 4500 cP and with TGA$_{10}$: 225° C.; TGA$_{50}$: 290° C.

EXAMPLE 3

Preparation of phosphoric acid: (2-bromoethyl)(2-chloroethyl)(2-bromo-3-(2,3-dibromopropoxy)propyl)ester Into a flask are placed 137.5 g of PCl$_3$ (1.0 mole) and 500 ml of chloroform. This mixture is stirred while 62 g of ethylene glycol is added dropwise. Upon completion of this addition, the mixture is stirred at 40° C. with nitrogen purge for 1 hour. The reaction is next cooled to ice water bath temperatures. Next, 160 g of bromine (1.0 mole) is added dropwise. The resultant mixture is stirred for 1 hour while warming to room temperature. Next, 1 ml of TiCl$_4$ is added, and 114 g of allyl glycidyl ether is next added dropwise. Upon completion of the reaction, a solution of 50 g of ethylene oxide in 100 ml of chloroform is added dropwise. The mixture is slowly heated to 60° C., and some of the low boilers are distilled off. The mixture is next cooled to ice bath temperatures. Next, 160 g of bromine is added dropwise. The product is worked up in the usual manner to give 546 g of oil at 90 percent yield with Brookfield viscosity (no. 6 spindle; 100 rpm; 25° C.) of 1800 cP. TGA$_{10}$: 261° C.; TGA$_{50}$: 311° C. MW: 604.5 with 52.9 percent Br; 5.9 percent Cl; 5.1 percent P.

EXAMPLE 4

Preparation of phosphoric acid: bis(2-chloroethyl)(2-chloro-3-(2,3-dibromopropoxy)propyl)ester Into a flask are placed 77 g of POCl$_3$ (0.5 mole), 1 ml of TiCl$_4$ and 300 ml of chloroform. This mixture is stirred while 57 g of allyl glycidyl ether (0.5 mole) is added dropwise. Next, 50 g of ethylene oxide (1.2 moles) in 50 ml of chloroform is added dropwise. The resultant mixture is refluxed for 1 hour, and some of the low boilers are distilled off. Upon cooling to 10° C., 80 g of bromine (0.5 mole) is added dropwise. Workup by the usual manner gives 210 g of dark oil at 82 percent yield with Brookfield viscosity (no. 6 spindle; 100 rpm; 25° C.) of 1400 cP. MW: 516 with 31.0 percent Br; 20.7 percent Cl; 6.0 percent P.

EXAMPLE 5

Preparation of phosphoric acid: (2-chloroethyl)(3-bromo-2,2-bis(bromoethyl)propyl)(2-bromo-3-(2,3-dibromopropoxy)propyl)ester Into a flask are placed 66 g of 2,2-bis(bromomethyl)-1,3-propanediol (0.25 mole) and 250 ml of carbon tetrachloride. This mixture is stirred and is heated to 40° C. The heat source is removed, and 34 g of PCl$_3$ (0.25 mole) is added dropwise. Upon completion of this addition, the mixture is refluxed until HCl generally ceases to distill out. The mixture is cooled in an ice water bath to 10° C. Next, 40 g of bromine (0.25 mole) is added dropwise. Upon completion of this addition, the mixture is stirred for 2 hours while warming to room temperature. Next, 1 ml of TiCl$_4$ is added, and 29 g of allyl glycidyl ether (0.25 mole) is next added dropwise. The mixture is refluxed 1 hour and following this is allowed to cool. Next, 20 g of ethylene oxide (0.45 mole) is added dropwise in 50 ml of carbon tetrachloride. Upon completion of this addition, the mixture is refluxed for 1 hour, and some low boilers are distilled off. The mixture is next cooled to 10° C. in an ice water bath. Next, 40 g of bromine (0.25 mole) is added dropwise. Upon completion of this addition, the mixture is stirred for 1 hour while warming to room temperature. Next, 100 ml of dilute HCl water solution is added, and the mixture is stirred for 15 minutes. The product layer is worked up in the usual manner to give 182 g of an oil at 90 percent yield with Brookfield viscosity (no. 6 spindle; 100 rpm; 25° C.) of 24,000 cP.

EXAMPLE 6

Preparation of phosphoric acid: (2-chloroethyl)(3-bromo-2,2-bis(bromomethyl)-propyl)(2-bromo-3-(3-bromo-2,2-bis(bromomethyl)-propoxy)propyl)ester Into a flask are placed 73 g of (3-bromo-2,2-bis(bromomethyl)propyl)phosphorylbromidochlorido ester (0.15 mole) and 300 ml of chloroform. This mixture is stirred, and ½ ml of TiCl$_4$ is added. Next, 57 g of (3-bromo-2,2-bis(bromomethyl)propyl)glycidyl ether (0.15 mole) is added dropwise. Upon completion of this addition, the mixture is refluxed for 2 hours and is allowed to cool to room temperature. Next, 8 g of ethylene oxide in 25 ml of chloroform is added dropwise, and upon completion of this addition, the mixture is refluxed for 1 hour. A portion of the low boilers is distilled off, and the mixture is allowed to cool to room temperature. The product is stirred with 100 ml of dilute HCl, and the product layer is separated, is stirred with 100 ml of dilute base, is separated, is dried over sodium sulfate, is filtered and solvent is distilled off under reduced pressure to produce 129 g of an oil at 98 percent yield with Brookfield viscosity (no. 6 spindle; 100 rpm; 25° C.) of 36,000 cP.

EXAMPLE 7

Preparation of phosphoric acid: bis(2-chloroethyl)(2-(3-bromo-2,2-bis(bromomethyl)-propoxy)ethoxy)ethyl ester Into a flask are placed 82 g of 2,2-bis(bromomethyl)-1,3-propanediol (0.25 mole) and 300 ml of carbon tetrachloride. This mixture is stirred and is heated until a solution is obtained. Next, 1 ml of BF$_3$-etherate is added, and 22 g of ethylene oxide in 50 ml of carbon tetrachloride is next added dropwise. An exothermic reaction occurs. Upon completion of this addition, the mixture is stirred until reaction is complete. Next, 38 g of POCl$_3$ (0.25 mole) is added dropwise, and upon completion of this addition, the mixture is refluxed for 2 hours. Upon cooling to 40° C., 1 ml of TiCl$_4$ is added. Next, a solution of 30 g ethylene oxide in 50 ml of carbon tetrachloride is added dropwise. An exotherm occurs. Upon completion of this addition, the mixture is refluxed for 2 hours, and a portion of solvent is removed by distillation. Upon cooling to room temperature, 200 ml of dilute aqueous HCl solution is added, and the mixture is stirred, and the product layer is separated and is next washed with 200 ml of dilute base water solution, is separated, is dried over sodium sulfate, is filtered, and solvent is removed under reduced pressure at 80° C. to give 155 g oil at 100 percent yield, with Brookfield viscosity (no. 6 spindle; 100 rpm; 25° C.) of 300 cP. $TGA_{10}$: 220° C.; $TGA_{50}$: 276° C.

EXAMPLE 8

Preparation of phosphoric acid: bis(2-chloroethyl)(2-chloro-3-(3-bromo-2,2-bis(bromomethyl)propoxy)propyl)ester Into a flask are placed 39 g of $POCl_3$ (0.25 mole), 200 ml of carbon tetrachloride and 1 ml of $TiCl_4$. This mixture is stirred while 96 g of (3-bromo-2,2-bis(bromomethyl)propyl)glycidyl ether (0.25 mole) is added dropwise. Upon completion of this addition, the mixture is refluxed for 3 hours. The mixture is next allowed to cool. Next, 30 g of ethylene oxide in 50 ml of solvent is added dropwise. Upon completion of this addition, the mixture is refluxed for 2 hours and is allowed to cool to room temperature. Next, 100 ml of dilute HCl water solution is added, and the mixture is stirred. The product layer is separated and is next stirred with 100 ml of dilute base water solution. The product layer is separated, is dried over sodium sulfate, is filtered, and the solvent is removed under reduced pressure at 80° C. to produce 149 g of an oil at 96 percent yield with Brookfield viscosity (no. 6 spindle; 100 rpm; 25° C.) of 1000 cP. $TGA_{10}$: 234° C.; $TGA_{50}$: 331° C.

EXAMPLE 9

Preparation of phosphoric acid: bis(2-chloroethyl) 2-(3-(3-bromo-2,2-bis(bromomethyl)propoxy)-1-(2,3-dibromopropoxy)ethyl ester Into a flask are placed 82 g of 3-bromo-2,2-bis(bromomethyl)-1-propanol (0.25 mole) and 300 ml of carbon tetrachloride. This mixture is slowly heated until a solution is obtained. The heat source is removed, and 1 ml of $BF_3$-etherate is added. Next, 29 g of allyl glycidyl ether (0.25 mole) is added dropwise. Upon completion of the reaction, a solution of 11 g of ethylene oxide (0.25 mole) in 25 ml of solvent is added dropwise. Upon completion of this reaction, the mixture is cooled to ice water bath temperatures. Next, 40 g of bromine (0.25 mole) is added dropwise. Upon completion of this addition, the mixture is stirred for 1 hour while warming to room temperature. Next, 38 g of $POCl_3$ is added dropwise, and upon completion of this addition, the mixture is refluxed for 3 hours. The mixture is allowed to cool to room temperature, and 1 ml of $TiCl_4$ is next added. A solution of 30 g of ethylene oxide in 75 ml of $CCl_4$ is next added dropwise. An exothermic reaction occurs. Upon completion of this reaction, the mixture is refluxed for 3 hours. Some of the low boilers are distilled off, and the mixture is allowed to cool. Next, 100 ml of dilute HCl water solution is added, and the mixture is stirred for 10 minutes. The product layer is separated and is stirred with 100 ml of dilute base water solution, is separated, is dried over sodium sulfate, is filtered, and the solvent is removed to give 210 g of an oil at 100 percent yield with Brookfield viscosity (no. 6 spindle; 100 rpm; 25° C.) of 1900 cP. $TGA_{10}$: 238° C.; $TGA_{50}$: 321° C.

EXAMPLE 10

Preparation of phosphoric acid: bis(2-chloroethyl) 2-(3-(3-bromo-2,2-bis(bromomethyl)propoxy)ethyl ester The following components are mixed according to the general procedure of Example 9 (without the halogenation step) in the following order: 82 g of 3-bromo-2,2-bis(bromomethyl)-1-propanol (0.25 mole); 300 ml of $CHCl_3$; 1 ml of $BF_3$-etherate; 11 g of ethylene oxide in 25 ml of solvent; 39 g of $POCl_3$ (0.25 mole); 1 ml of $TiCl_4$; and 30 g of ethylene oxide. The run produces 156 g of oil at 100 percent yield with Brookfield viscosity (no. 6 spindle; 100 rpm; 25° C.) of 200 cP. $TGA_{10}$: 209° C.; $TGA_{50}$: 276° C.

EXAMPLE 11

Preparation of phosphoric acid: bis(2-chloroethyl)(1-chloro-3-(3-bromo-2,2-bis(bromomethyl)propoxy)-2-propyl)ester The following components are mixed according to the procedure of Example 10 in the following order: 82 g of 3-bromo-2,2-bis(bromomethyl)-1-propanol (0.25 mole); 300 ml of 1,2-dichloroethane; 1 ml of $BF_3$-etherate; 23 g of epichlorohydrin (0.25 mole); 39 g of $POCl_3$ (0.25 mole); 1 ml of $TiCl_4$; and 30 g of ethylene oxide. The run produces 157 g of oil at 100 percent yield with Brookfield viscosity (no. 6 spindle; 100 rpm; 25° C.) of 250 cP. $TGA_{10}$: 214° C.; $TGA_{50}$: 254° C.

EXAMPLE 12 WITH COMPARATIVE

Laboratory studies of flame-retardant flexible foams including discoloration studies This example illustrates characteristics of flame-retardant flexible polyurethane foams with a sample of flame-retardant (i.e., Sample FR) component of the following haloether phosphorates, or the Sample FR is otherwise as follows.

| Sample FR Identification | |
|---|---|
| Sample FR | Comment |
| A (Example 1) | |
| B (Example 2) | |
| C (Example 3) | |
| THERMOLIN* 101 (Comparative) | Thermolin* 101 is tetrakis(2-chloroethyl) ethylene diphosdiphosphate and is available from the Olin Corporation |

From the following components, and the above-identified Sample FR's, a 110 Index foam with density of 1.2 to 1.3 pcf (pounds per cubic foot) (19 to 21 kg per cubic meter) and airflow of from 2.4/1.6 to 6.4 cfm (cubic feet per minute) (45 to 180 liters per minutes) is prepared and is evaluated as follows.

| Components | Weight (g) |
|---|---|
| A-Side: | |
| Voranate* T-80 (80:20 weight ratio of toluene-2,4 and 2,6 diisocyanate respectively) | 62.3 |
| B-Side: | |
| 1. Voranol* 3137 (A polyol with a hydroxy number of about 53.4) | 100 |
| 2. FR Sample | 10[1] |
| 3. Water | 5 |
| 4. Q-25125 (Silicone surfactant available from The Dow Corning Company) | 1 |
| 5. Methylene chloride | 6 |
| 6. NIAX TM A200 (amine catalyst available from Union Carbide) | 0.275 |
| 7. T-9 | 0.225–0.25 |

-continued

| Components | Weight (g) |
|---|---|
| (stannous octoate available from M&T Chemical) | 5 |

[1] Unless otherwise indicated
*Trademark of the Dow Chemical Company

FOAM PREPARATION

First, the A-side is weighed into a 4-ounce glass bottle and set aside. Second, the components of the B-side are weighed into a 32-ounce paper cup in the numerical order listed above. Third, the B-side is then mixed for 15 seconds on a variable speed overhead mixer. Fourth, the A-side is immediately added to the B-side and mixed for an additional 5 seconds. Fifth, the A-side/B-side mixture is poured into a 1-gallon paper container.

DISCOLORATION

Foam samples are placed in a preheated air (70° C.) circulating oven for 30 minutes. A foam sample of each is similarly prepared and immediately cured in an oven at 160° C. and approximately 100 percent relative humidity for one hour (160° C.), by the Wampfler-Fielding procedure of U.S. patent application filed concurrently herewith (Attorney Docket No. C-35, 122) (incorporated herein by reference), which conditions are appreciably more severe than those typically encountered in commercial production of flexible foams. The foam samples are next removed from the oven and allowed to cool to room temperature for the following evaluations.

A 2-inch cross-sectional slice is cut off the top of each foam sample. Next, a 2-inch section is cut from the middle of each cross-sectional slice. The underside of this section is used for color determination.

Color is measured on a Macbeth Colorimeter using the Hunter Color Scale. Three measurements are made for each sample and then averaged. The average delta E value ($\Delta E$) for each sample is then compared to the average $\Delta E$ value determined by the Hunter Color Scale for an otherwise equivalent foam sample section containing no flame retardant.

From the foregoing, the following discoloration results are obtained.

| Sample FR | 70° C. | $\Delta E$ 160° C. |
|---|---|---|
| (1) A | ND | — |
| (2) B | ND | 25 |
| (3) C | ND | 25 |
| THERMOLIN* 101 | ND | 17.5 | wherein ND signifies essentially no discoloration.

The results as are obtained with Sample FR of A, B and C are generally comparable to those values as are obtained with Sample FR of the THERMOLIN* 101, which is typically sold as a substantially non-scorching flame retardant. Thus, the haloether phosphorates are substantially non-scorching flame retardants.

FLAME-RETARDANT EFFICIENCY

Other foams are similarly prepared. The foams are subjected to the California 117 test. The following results are obtained.

| Sample Fr | Density | Airflow | Nonage/Age Vertical Flame | Smoldering |
|---|---|---|---|---|
| B | 1.25 | 4.4 | p/p | f |
| B | 1.25 | 4.1 | p/p | f |
| C | 1.27 | 6.1 | p/p | f |
| C | 1.26 | 6.4 | p/p | f |
| C (8 pph) | 1.28 | 5.3 | f/p | f |
| C (8 pph) | 1.24 | 4.5 | p/p | f |
| C | 1.29 | 2.8 | p/— | p |
| C | 1.27 | 2.4 | p/— | p | wherein
density is in the units of pcf (pounds per cubic foot);
airflow is in the units of cfm (cubic feet per minute);
p indicates pass;
f indicates fail;
"Nonage" indicates virgin foam is tested; and
"Age" indicates that the test is conducted subsequent to aging the foam at 104° C. for 24 hours.

EXAMPLE 13

Commercial-type production

If, by the one-shot technique, a commercial-type scale slabstock flexible polyurethane foam with about 110 index is prepared with about 10 pph of the haloether phosphorate as prepared by the procedure of Examples 1–3 incorporated therein, the foam is easily processable. In addition, the foam exhibits high flame-retardant efficiency, passing the Vertical Burn portion of the California 117 test as set out by the California 117 test requirements, is substantially non-scorching and is essentially non-odoriferous.

We claim:

1. A method for improving a production characteristic of flame-retardant polyurethanes comprising incorporation of a haloether phosphorate flame-retardant compound into a polyurethane under conditions sufficient to improve said characteristic, the haloether phosphorate being in an amount effective to reduce combustibility of the polyurethane.

2. The method of claim 1 wherein said characteristic is selected from the group consisting of
(1) processability;
(2) scorch;
(3) odor; and
(4) flame-retardant efficiency.

3. A method for improving a production characteristic of flame-retardant polyurethane, the characteristic being selected from the group consisting of processability, scorch, odor, and flame-retardant efficiency, the method comprising incorporating a haloether phosphorate flame-retardant compound represented by the general formula:

$$X^3H_2C-\underset{\underset{CH_2X^3}{|}}{\overset{\overset{CH_2X^3}{|}}{C}}-CH_2(-OR^3-)_nO-\underset{\diagdown O((C_2H_3)R^4)X^4}{\overset{O}{\overset{\|}{P}}\diagup^{O((C_2H_3)R^4)X^4}}$$

wherein
n is an integer from 0 to 5;
$R^3$ is independently at each occurrence selected from the group consisting of $C_{2-5}$ alkyl and $C_{3-5}$ haloalkyl;

R$^4$ is independently at each occurrence selected from the group consisting of H, C$_{1-4}$ alkyl, C$_{3-7}$ hydrocarbyloxyalkyl, C$_{1-4}$ haloalkyl and C$_{3-7}$ haloalkoxyalkyl;

X$^3$ is selected from the group consisting of H, Cl, Br and C$_{1-5}$ alkyl; and X$^4$ is independently at each occurrence selected from the group consisting of H, Cl and Br, and at least one X$^3$ or X$^4$ is Cl or Br;

provided that if each R$^4$ is H or C$_{1-4}$ alkyl, n is at least 1, and if n is 0, R$^4$ is C$_{3-7}$ hydrocarbyloxyalkyl or C$_{3-7}$ haloalkoxyalkyl;

into a polyurethane under conditions sufficient to improve said characteristic, the haloether phosphorate being in an amount effective to reduce combustibility of the polyurethane.

4. The method of claim 3 wherein the flame-retardant polyurethane is a slabstock flexible polyurethane foam.

5. The method of claim 4 wherein the foam is prepared by the one-shot process.

6. The method of claim 5 wherein said characteristic is processability, and the processability is characterized by said flame-retardant compound having a Brookfield viscosity of about 2000 cP or below.

7. The method of claim 6 wherein said characteristic is scorch, and the scorch is characterized by a substantially non-scorching polyurethane.

8. The method of claim 7 wherein said characteristic is odor, and the odor is characterized by a substantially non-odoriferous polyurethane.

9. The method of claim 8 wherein said characteristic is flame-retardant efficiency, and the flame-retardant efficiency is characterized by the polyurethane passing the Vertical Burn portion of the California 117 test.

10. The method of claim 9 wherein said characteristic is selected from the group consisting of scorch and odor, and the scorch is characterized by a substantially non-scorching polyurethane with a ΔE of 4 or below based on the Hunter scale.

11. The method of claim 10 wherein said characteristic is odor, and the odor is characterized by a substantially non-odoriferous polyurethane.

12. The method of claim 11 wherein the flame-retardant polyurethane is a slabstock flexible polyurethane foam.

13. A composition of matter comprising a polyurethane and a flame-retardant effective amount of a haloether phosphorate incorporated therewith.

14. A composition of matter comprising a haloether phosphorate flame-retardant compound and a polyahl, which composition is useful for preparation of a substantially non-scorching flexible polyurethane foam.

15. A composition of matter comprising a polyurethane and a haloether phosphorate flame-retardant compound represented by the general formula:

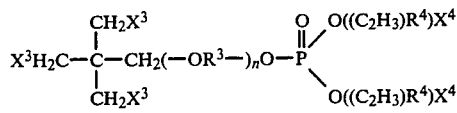

wherein n is an integer from 0 to 5;

R$^3$ is independently at each occurrence selected from the group consisting of C$_{2-5}$ alkyl and C$_{3-5}$ haloalkyl;

R$^4$ is independently at each occurrence selected from the group consisting of H, C$_{1-4}$ alkyl, C$_{3-7}$ hydrocarbyloxyalkyl, C$_{1-4}$ haloalkyl and C$_{3-7}$ haloalkoxyalkyl;

X$^3$ is selected from the group consisting of H, Cl, Br and C$_{1-5}$ alkyl; and X$^4$ is independently at each occurrence selected from the group consisting of H, Cl and Br, and at least one X$^3$ or X$^4$ is Cl or Br;

provided that if each R$^4$ is H or C$_{1-4}$ alkyl, n is at least 1, and if n is 0, R$^4$ is C$_{3-7}$ hydrocarbyloxyalkyl or C$_{3-7}$ haloalkoxyalkyl.

16. The composition of claim 15 wherein the polyurethane is a polyahl.

17. The composition of claim 16 wherein the haloether phosphorate flame-retardant compound comprises from about 2 to about 20 parts by weight of the polyahl.

* * * * *

UNITED STATES PATENT AND TRADEMARK OFFICE
CERTIFICATE OF CORRECTION

Page 1 of 2

PATENT NO. : 4,690,954
DATED : September 1, 1987
INVENTOR(S) : David J. Wampfler; Donna J. Fielding; and Chester E. Pawloski It is certified that error appears in the above-identified patent and that said Letters Patent is hereby corrected as shown below:

Column 4, lines 5-6, delete "(($\beta$-neocarbyl)bis(haloalkyl)ether" and insert -- (($\beta$-neocarbyl)bis(haloalkyl))ether --.

Column 5, line 23, delete "at" and insert -- as --.

Column 6, line 40, delete "as" and insert -- are --.

Column 8, line 13, delete "element" and insert -- elemental --.

Column 9, line 13, delete "oxiane" and insert -- oxirane --.

Column 10, line 18, delete "included" and insert -- include --.

Column 10, line 19, delete "2,2-bis(bromomethyl)propy" and insert -- 2,2-bis(bromomethyl)propyl --.

Column 11, line 43, insert -- , -- after the word sorbitol.

Column 11, line 47, delete "weight" and insert -- weights --.

Column 14, line 44, delete "20" and insert -- 10 --.

Column 16, line 33, delete "was" and insert -- are --.

Column 16, line 51, insert -- is -- after the word obtained.

UNITED STATES PATENT AND TRADEMARK OFFICE
CERTIFICATE OF CORRECTION

PATENT NO. : 4,690,954

DATED : September 1, 1987

INVENTOR(S) : David J. Wampfler; Donna J. Fielding; and Chester E. Pawloski

It is certified that error appears in the above-identified patent and that said Letters Patent is hereby corrected as shown below:

Column 17, line 10, delete "225° C" and insert -- 255°C --.

Column 17, line 57, delete "(bromoethyl)" and insert -- (bromomethyl) --.

Column 22, line 51, delete "polyurethane" and insert -- polyurethanes --.

Cover page, [56], delete "Re. 124,514" and insert -- Re. 224,514 --.

Signed and Sealed this

Third Day of May, 1988

Attest:

DONALD J. QUIGG

Attesting Officer

Commissioner of Patents and Trademarks